Patented June 6, 1950

2,510,281

UNITED STATES PATENT OFFICE 2,510,281

METHOD OF MAKING β-AMINO SULFONIC COMPOUNDS

Marvin H. Gold, Chicago, Ill., assignor to The Visking Corporation, Chicago, Ill., a corporation of Virginia No Drawing. Application September 21, 1945, Serial No. 617,929

10 Claims. (Cl. 260—513)

This invention relates to new chemical compounds and the method of making the same. More particularly, it relates to β-nitro sulfonic acids and salts thereof as well as a method of preparing the same.

The term β- (beta) as used herein defines the arrangement wherein the carbon atom attached to the nitro group is adjacent to the carbon atom holding the sulfonic acid group.

The β-nitro sulfonic acids and salts thereof which constitute one phase of this invention can be represented by the following generic formula:

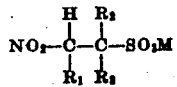

wherein $R_1$ represents hydrogen, alkyl, aryl, halogen, alkoxy or aryloxy group,
$R_2$ represents hydrogen, alkyl, aryl, halogen, alkoxy or aryloxy group,
$R_3$ represents hydrogen, alkyl, aryl, halogen, alkoxy or aryloxy group, and
M represents hydrogen, a metallic ion, ammonium or substituted ammonium ion.

The salts of β-nitro sulfonic acids are obtained according to one phase of this invention by reacting the selected nitro olefin with an alkali metal, ammonium or N-substituted ammonium bisulfite. In the process generally the selected olefin as such or in an appropriate solvent is added to an aqueous solution of the selected bisulfite. The bisulfite adds to the nitro olefin as shown by the following equation illustrating the reaction which takes place when nitroethylene is added to an aqueous solution of ammonium bisulfite:

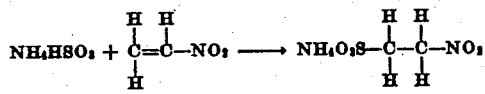

As is indicated by the above equation, theoretically 1 mol of bisulfite reacts with 1 mol of nitro olefin. In practice, however, a slight excess of bisulfite is utilized, though, of course, the reactants may be used in the theoretical amount required for the reaction or the nitro olefin may be used in excess of the theoretical amount required for the reaction.

The reaction is generally exothermic and requires external cooling to maintain it at optimum temperature. Nitro olefins of low molecular weight react with bisulfites at a lower temperature than those of higher molecular weight. Though in the preferred operation of the process the reaction was carried out at a temperature of from 10° C. to 60° C., it is to be understood, however, that temperatures higher than 60° C. and lower than 10° C. can also be used.

The nitro olefin which constitutes one of the reactants can be represented by the following general formula:

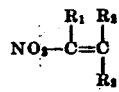

wherein $R_1$ represents hydrogen, alkyl, aryl, halogen, alkoxy or aryloxy group,
$R_2$ represents hydrogen, alkyl, aryl, halogen, alkoxy or aryloxy group, and
$R_3$ represents hydrogen, alkyl, aryl, halogen, alkoxy or aryloxy group.

As illustrative specific nitro olefins which can be used in the process are the following:

2-nitro-1-butene
2-phenyl-1-nitroethylene
1-nitropropene
2-nitropropene
Nitroethylene
1-phenyl-1-nitroethylene
1-phenyl-1-nitropropene
1-naphthyl-1-nitroethylene
1-naphthyl-1-nitropropene
2-naphthyl-1-nitropropene
1-chloro-1-nitroethylene
1-chloro-1-nitropropene
1-methoxy-1-nitroethylene
1-methoxy-2-nitroethylene
2-methoxy-2-phenyl-1-nitroethylene
2-phenoxy-1-nitroethylene In place of the nitro olefins, nitro cyclo compounds, such as 1-nitrocyclohexene and 2-methyl-1-nitrocyclohexene, can be used as one of the reactants.

As previously mentioned, the bisulfite which is utilized in the process can be an alkali metal, ammonium, or N-substituted ammonium bisulfite. Sodium bisulfite and potassium bisulfite are illustrative examples of alkali metal bisulfites which can be used in the process. Bisulfites of the following N-substituted ammonium ions are illustrative examples of specific N-substituted ammonium bisulfites which can be used in the process:

Any alkaloid
Methyl ammonium
Dimethyl ammonium
Trimethyl ammonium
Methyl dibenzyl ammonium
Dimethyl benzyl ammonium
Diethyl phenyl ammonium
Cetyl dimethyl ammonium
Quinolinium
Pyridinium
Morpholine
N-methyl morpholine
Ethyl diethanol ammonium
Triethanol ammonium
Piperidinium
N-methyl piperidinium
etc.

The previously described process produces an alkali metal, ammonium, or N-substituted ammonium salt of β-nitro sulfonic acid. Such a salt can, in accordance with another phase of this invention, be converted to the corresponding free nitro sulfonic acid or a salt containing any desired cation.

The free nitro sulfonic acid is prepared, in general, from the bisulfite addition product by ion exchange using any of the well-known ion exchange procedures and materials, such as, for example, a certain exchange resin. Thus, by passing a salt of the nitro sulfonic acid through a column of an acid form of cation exchange resin, an aqueous solution of the free nitro sulfonic acid is obtained. The solution of the free nitro sulfonic acid can be concentrated or diluted as desired by the appropriate removal or addition of water. If desired, the free sulfonic acid can be removed from solution in any appropriate manner.

When a salt having a cation other than that obtained by the hereinbefore described bisulfite addition process is desired, such salt can be obtained by appropriate reaction of the free nitrosulfonic acid and a compound containing the desired cation. In one embodiment of this form of the invention, the aqueous solution of the free nitro sulfonic acid obtained from a column of a cation exchange resin with or without dilution or concentration as desired is treated with an equivalent quantity of an oxide, hydroxide, or carbonate of any desired cation or substituted ammonia. The salts are obtained by evaporation of the water and are purified by recrystallization from appropriate solvents.

Alternatively, a solution of a bisulfite addition product can be passed over a cation exchange resin which has been converted to the desired cation form. The resulting aqueous effluent contains the new cation salt of the nitro sulfonic acids.

The β-nitro sulfonic acids or their salts can also, in accordance with another phase of this invention, be converted to the corresponding β-amino sulfonic acids. According to this phase of the invention, the hereinbefore mentioned β-nitro sulfonic acids or salts thereof are reduced to the corresponding amino sulfonic acid.

The precise β-amino sulfonic acid obtained depends on the β-nitro sulfonic acid or salt thereof reduced. In general, the β-amino sulfonic acid which can be obtained can be represented by the following general formula:

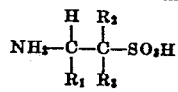

wherein $R_1$ represents hydrogen, alkyl, aryl, alkoxy or aryloxy group, $R_2$ represents hydrogen, alkyl, aryl, alkoxy or aryloxy group, and $R_3$ represents hydrogen, alkyl, aryl, alkoxy or aryloxy group.

Preferably, the reduction is carried out by either an iron reduction in aqueous solution or by hydrogenization using a catalytic agent, such as nickel, although other known reducing procedures can be used.

The manner and details for practicing the invention will become more apparent from the specific examples hereinafter set forth, it being understood that the invention is not restricted to such specific examples which are set forth as illustrative embodiments only. In the examples, the proportions are parts by weight, and the temperatures are the uncorrected centigrade thermometer readings.

PREPARATION OF SALTS OF β-NITRO SULFONIC ACIDS

Example 1

To a well-stirred solution of 538 parts of a 43% aqueous ammonium bisulfite solution initially brought to 30° was added 226 parts of 2-nitro-1-butene over a period of fifteen minutes. By external cooling, the reaction temperature was kept between 35°–40°. The crystalline product separated as the reaction proceeded. When addition was complete, stirring was continued while the temperature was kept between 35°–40° for thirty minutes longer. Then the reaction mixture was cooled to 10° and the product separated by filtration. The filtrate was concentrated and additional quantities of the product were recovered by crystallization therefrom to give a final yield of 88% of ammonium-2-nitrobutane-1-sulfonate. A sample purified for analysis by crystallization from methanol melted with decomposition at 203°–206°.

Example 2

To a well-stirred solution of 23.2 parts of a 43% aqueous ammonium bisulfite solution warmed to 40° was added a solution of 15 parts 2-phenyl-1-nitroethylene in 15 parts dioxan over a period of about five minutes while keeping the reaction temperature at 40° by external cooling. After stirring the reaction mass, while the temperature was maintained at 40°, thirty minutes longer, the mixture was cooled by means of an ice-bath, thereby causing crystallization of the reaction product. The crystallized product was removed by filtration. The additional reaction product was isolated in a similar manner after concentrating the filtrate under reduced pressure. The desired product was then separated from inorganic material by taking up in hot ethanol. Upon the addition of benzene and allowing the material to crystallize slowly, 20 parts (80% yield) of ammonium-2-nitro-1-phenyl ethane-1-sulfonate was obtained, melting with decomposition at 170°–174°. This material was found to have two melting points. Upon rapid crystallization from concentrated ethanolic solutions, a low melting form could often be obtained. Either form is convertible to the other by seeding or the mode of crystallization. The purified materials had the melting points of 130°–131° and 170°–171° with decomposition.

Example 3

To a well-stirred solution of 550 parts of a 43% aqueous ammonium bisulfite solution warmed to 30° was added 198 parts of 1-nitropropene over a period of thirty minutes while the reaction temperature was kept between 35°–40° by external cooling. After the addition was complete, stirring was continued, while the temperature was kept between 35°–40°, for an additional thirty minutes. The resulting clear solution was concentrated under reduced pressure to a thick viscous oil. This was taken up in hot ethanol, leaving behind a small amount of inorganic bisulfite. Upon the addition of methyl isobutyl ketone and cooling in a refrigerator to a temperature of 5°, a total of 350 parts (in three crops), corresponding to 83% yield of ammonium-1-nitropropane-2-sulfonate, was obtained. The purified product, after several recrystallizations from ethanol-methyl isobutyl ketone mixtures, melted at 141°–143°.

This product is of a soft waxy crystalline nature and appears to form solid gels with solvents such as benzene and various ketones.

Example 4

To a well-stirred solution of 200 parts of a 43% aqueous ammonium bisulfite solution was added 72.6 parts of 2-nitropropene over a period of fifteen minutes. The reaction temperature was kept between 30°–40° by external cooling. Stirring was continued for an additional thirty minutes at room temperature. Then the reaction mixture was cooled to 10° and the crystalline product was separated by filtration. Some additional material was obtained by crystallization at 10° from the filtrate after inorganic salts precipitated with methanol were removed and the filtrate concentrated under reduced pressure. A total yield of 135 parts (87% yield) of ammonium-2-nitro-propane-1-sulfonate was recovered in this manner. The product purified for analysis by recrystallization from methanol melted with decomposition at 190°–191°.

Example 5

To a well-stirred solution of 125 parts of a 43% aqueous ammonium bisulfite solution held at 15°–20° was added 38 parts of pure nitroethylene over a period of thirty minutes. Stirring was then continued at room temperature for an additional thirty minutes. At the end of this period the reaction mixture was cooled to 5° and the crystalline product separated by filtration. The filtrate was concentrated and some additional product was obtained therefrom by crystallization at 5° to give a total yield of 89.5 parts or 70% of ammonium-2-nitroethane-1-sulfonate. A sample purified for analysis by recrystallization from ethanol melted with decomposition at 191.5°–192°.

PREPARATION OF β-NITRO SULFONIC ACID AND SALTS THEREOF

Example 6

A glass column filled with Zeo Karb cation exchange resin was treated with a 4% aqueous solution of hydrochloric acid to convert the resin to the acid form. Then excess acid was removed by washing the column with distilled water until no more chloride ion could be detected in the effluent. Next a solution of 50 g. of ammonium-2-nitro butane-1-sulfonate in 1250 cc. distilled water was passed through the column. The exchange was completed by washing with distilled water until the effluent no longer gave a test for acidity. The combined effluent contained the free 2-nitrobutane-1-sulfonic acid. It was measured and an aliquot portion titrated for acidity. The selected amine, oxide, hydroxide or carbonate in equivalent quantity was reacted with the solution and, upon evaporation of the mixture, the corresponding salt of the nitro sulfonic acid was obtained. Several illustrative salts and their analyses obtained in this procedure are listed in the "Table I" hereinafter set forth.

PREPARATION OF SALTS OF β-NITRO SULFONIC ACID BY ION EXCHANGE

Example 7

The column of a Zeo Karb ion exchange resin was saturated with a dilute aqueous solution containing 3%–5% of sodium chloride. Then after washing the column thoroughly with distilled water, a 4% solution of ammonium-2-nitrobutane-1-sulfonate was passed through. The effluent and washings were concentrated on the steam bath to give sodium-2-nitrobutane-1-sulfonate, which is identical with the product obtained by the procedure of Example 6 when sodium carbonate or hydroxide was reacted with the free acid.

The properties of the products of Examples 1–7 inclusive are set forth in the following table:

TABLE I.—SALTS OF β-NITRO SULFONIC ACIDS

| Example | Formula | M. P., °C. | Per Cent Cation | | Per Cent Nitrogen | | Per Cent Sulfur | |
|---|---|---|---|---|---|---|---|---|
| | | | Found | Theory | Found | Theory | Found | Theory |
| 1 | $C_2H_5CH(NO_2)CH_2SO_3NH_4$ | 203–206° dec | | | 13.51 | 13.99 | 16.03 | 15.91 |
| 2 | $C_2H_5CH(SO_3NH_4)CH_2NO_2$ | 130–131°<br>170–171° dec | | | 11.20 | 11.29 | 12.90 | 12.90 |
| 3 | $CH_3CH(SO_3NH_4)CH_2NO_2$ | 141–143° | | | 14.57 | 15.05 | 17.43 | 17.22 |
| 4 | $CH_3CH(NO_2)CH_2SO_3NH_4$ | 190–191° dec | | | 14.46 | 15.05 | 17.04 | 17.22 |
| 5 | $NO_2CH_2CH_2SO_3NH_4$ | 191.5°<br>192.5° dec | | | 16.20 | 16.23 | 19.11 | 18.63 |
| 6–7 | $C_2H_5CH(NO_2)CH_2SO_3Na$ | 225° dec | 11.0 | 11.2 | | | 15.15 | 15.6 |
| 6 | $C_2H_5CH(NO_2)CH_2SO_3K$ | 232° dec | 17.6 | 17.7 | | | 14.1 | 14.5 |
| 6 | $(C_2H_5CH(NO_2)CH_2SO_3)_2Ba$ | 260° dec | 27.5 | 27.4 | | | 10.3 | 10.0 |
| 6 | $(C_2H_5CH(NO_2)CH_2SO_3)_2Ca$ | >300° | 9.94 | 9.9 | 7.22 | 6.95 | 15.55 | 15.85 |
| 6 | $(C_2H_5CH(NO_2)CH_2SO_3)_2Co$ | 210–211° dec | 13.33 | 13.9 | 6.26 | 6.62 | | |
| 6 | $C_2H_5CH(NO_2)CH_2SO_3Tl$ | 191–192° dec | | | 3.54 | 3.62 | 8.25 | 8.27 |
| 6 | $C_2H_5CH(NO_2)CH_2SO_3$·Brucine | 187–190° dec | | | 7.64 | 7.27 | 5.56 | 5.58 |
| 6 | $(C_2H_5CH(NO_2)CH_2SO_3)_2Pb$* | 145–148° dec | 37.1 | 36.2 | 4.38 | 4.9 | | |
| 6 | $(C_2H_5CH(NO_2)CH_2SO_3)_2Zn$† | 168–172° dec | 14.6 | 15.1 | | | 13.9 | 14.9 |

*The lead salt does not give a sharp analysis as it was contaminated by a polymeric lead salt, which could not be removed completely after many recrystallizations.
†The zinc salt was difficult to purify due to its extreme tendency toward coordination with most crystallization solvents.

PREPARATION OF β-AMINO SULFONIC ACIDS

Example 8

In a reaction vessel fitted with efficient stirrer and reflux condenser were placed 12 parts of iron filings and 55 parts of water. Then with rapid agitation was added 0.5 part concentrated hydrochloric acid. The mixture was heated to reflux and then 8 parts of ammonium-1-nitropropane-2-sulfonate in 15 parts of water was added dropwise. The reaction was stirred and refluxed for four hours. Then the precipitated iron oxides were removed by filtration of the hot solution. The filtrate was then made slightly alkaline with ammonium hydroxide and a little hydrogen peroxide added to oxidize ferrous ions to ferric. After stirring with a little charcoal and filtering, the filtrate was evaporated to a small volume. Addition of ethyl alcohol caused the slow crystallization of 1-aminopropane-2-sulfonic acid. Recrystallization from aqueous alcohol gave a product melting with decomposition at 283°–286°.

Example 9

In a suitable reaction vessel were placed 92 parts of iron filings and 150 parts of water. The mixture was vigorously stirred and 1.5 parts of concentrated hydrochloric acid was added. After five minutes 172 parts of ammonium-2-nitroethane-1-sulfonate and 50 parts more of water were added. The reaction mixture was slowly heated to reflux over a period of fifteen minutes. Then a solution of 50 parts concentrated hydrochloric acid in 50 parts of water was added dropwise with continued reflux over a period of thirty-five minutes. After refluxing and stirring for an additional hour, the reaction mixture was clarified with charcoal and evaporated to a small volume. Upon addition of ethyl alcohol, the desired 2-aminoethane-1-sulfonic acid crystallized from solution. Several recrystallizations from aqueous ethyl alcohol gave a product decomposing at 310°. A mixed melting point with an authentic sample of taurine gave no lowering in melting point.

Example 10

In a suitable reaction vessel were placed 42 parts of iron filings and 50 parts of water. Vigorous agitation was employed and 1 part of concentrated hydrochloric acid was added. After five minutes a solution of 62 parts of ammonium-2-nitropropane-1-sulfonate in 50 parts of water was added. The reaction mixture was then gradually heated to reflux. At the point of reflux, a solution of 23 parts hydrochloric acid in 50 parts of water was added dropwise over a period of thirty minutes, after which reflux was continued to the end of an hour. The hot solution was filtered and the precipitated iron oxide was washed with water. The combined washings were made basic with ammonia and treated with a little hydrogen peroxide. Then after clarification with charcoal, the solution was concentrated and a little ethyl alcohol added. The resulting 2-aminopropane-1-sulfonic acid, after several recrystallizations, melted at 318°–320° with decomposition.

Example 11

In a suitable reaction vessel were placed 35 parts of iron filings and 75 parts of water. Vigorous agitation was employed and 1 part of concentrated hydrochloric acid was added. After five minutes of stirring, 50 parts of ammonium-2-nitrobutane-1-sulfonate was added, followed by 75 parts more of water. The mixture was gradually heated to reflux and then 16 parts concentrated hydrochloric acid in 20 parts of water was added dropwise over a period of twenty minutes. After continued stirring and refluxing for one hour, the hot mixture was filtered. The precipitated iron oxides were washed with warm water. The combined filtrate and washings were made basic with ammonia and treated with a little hydrogen peroxide. Then after clarifying the solution with charcoal, it was concentrated to a small volume and allowed to crystallize. The resulting 2-amino-butane-1-sulfonic acid, after several recrystallizations from water, melted with decomposition at 303°–306°.

Example 12

A mixture of 20 parts of ammonium-2-nitrobutane-1-sulfonate, 100 parts of distilled water, and 3 parts of Raney nickel catalyst was placed in a hydrogenation bomb. The bomb was sealed and filled with hydrogen to a pressure of 1200 pounds. Then shaking was started and the bomb heated to 75°–80°. After two hours at this temperature there was no longer any drop in pressure. The bomb was cooled, opened, and the solution filtered from the nickel catalyst. The filtrate was concentrated and allowed to crystallize, giving 2-aminobutane-1-sulfonic acid, identical with that obtained by iron reduction in Example 11.

Example 13

In a suitable reaction vessel were placed 50 parts of iron filings and 100 parts of water. The mixture was stirred vigorously and 1 part of hydrochloric acid was added. Then heat was applied and the reaction brought to the reflux temperature. At this point, a solution of 15 parts of ammonium-2-nitro-1-phenylethane-1-sulfonate in 50 parts of water was dropped in over a period of fifteen minutes. Then the reaction was stirred under reflux for three hours. At the end of this period the hot mixture was filtered. The filtrate was made basic with ammonia and then oxidized with a little hydrogen peroxide. Then after clarifying with charcoal, the solution was concentrated and a little methanol added. The 2-amino-1-phenylethane-1-sulfonic acid crystallized in white platelets. Recrystallization from aqueous methanol gave a product melting at 379° with decomposition.

The properties of the products of Examples 8–13 inclusive are set forth in the following table:

TABLE II.—AMINO SULFONIC ACIDS

| Example | Formula | M. P., °C. | Per Cent Sulfur Theory | Per Cent Sulfur Found | | Per Cent Nitrogen Theory | Per Cent Nitrogen Found | |
|---|---|---|---|---|---|---|---|---|
| | | | | I | II | | I | II |
| 9 | $NH_2CH_2CH_2SO_3H$ | 310° dec | 25.62 | 25.48 | 25.44 | 11.20 | 11.09 | 11.34 |
| 10 | $NH_2CH(CH_3)CH_2SO_3H$ | 318°–320° dec | 23.03 | 23.04 | 23.00 | 10.06 | 10.14 | 9.83 |
| 8 | $NH_2CH_2CH(CH_3)SO_3H$ | 283°–286° dec | 23.03 | 22.95 | 23.23 | 10.06 | 9.73 | |
| 11–12 | $NH_2CH_2CH(C_2H_5)SO_3H$ | 303°–306° dec | 20.93 | 20.76 | 20.16 | 9.14 | 9.05 | 9.04 |
| 13 | $NH_2CH_2CH(C_6H_5)SO_3H$ | 379° dec | 15.92 | 16.20 | 16.05 | 6.97 | 7.20 | 7.07 |

It is to be understood that the foregoing data of Tables I and II were obtained from single preparations of each of the compounds, and, while such data will be useful in identifying these compounds, it is to be understood that the invention is not limited to products having the exact constants listed.

The Zeo Karb cation resin utilized in Examples 6 and 7 (product of Permutit Company) consists essentially of a sulfonated coal. Obviously, the invention is not restricted to such specific ion exchange resin and that other of the known appropriate ion exchange resins or salts can be used. The embodiment of the invention set forth in Example 7 is particularly suitable for monovalent cations, such as sodium, potassium, lithium, thallium, substituted ammonias, etc.

The ammonium salts of the nitro sulfonic acids are neutral salts, and, as shown in Examples 8–13 inclusive, such salts can be reduced to the corresponding amino compounds. The amino group is a basic group and, during the process of producing the same, produces an internal salt with the sulfonic radical which liberates free ammonia. The free ammonia is either vaporized out of the reaction mixture or neutralized by the addition of an acid, such as hydrochloric. When the cation of the salt of the nitro sulfonic acid undergoing reduction is a metal, an acid is added, as the reaction proceeds, to neutralize the metal hydroxide produced and form a neutral salt thereof. For example, if a calcium salt of the nitro sulfonic acid were reduced, an acid would be added, as the reaction proceeds, to neutralize the calcium hydroxide and form a neutral calcium salt.

In the method of reducing the salts of the nitro sulfonic acids, wherein the reduction is obtained through the use of iron, ferrous ions are produced. Ferric hydroxide is less soluble than ferrous hydroxide. Consequently, after the reduction operation all the iron is converted to the ferric state in order that it may be precipitated more completely and removed from the solution.

Any appropriate oxidizing agent to convert the ferrous ions to ferric ions can be used. Air may constitute such an oxidizing agent and when used it can be bubbled through the reaction medium. However, hydrogen peroxide is the preferred oxidizing agent since its action is faster and does not introduce any additional ions which might complicate the isolation of a pure product.

The use of charcoal in Examples 8–13 is not critical. It is used for the purpose of clarifying the reaction mixture when a pure while crystallized product is desired.

The instant invention provides nitro sulfonic acids and salts thereof which have not been previously known or described, and also new and effective processes for the production of such acids and salts.

The nitro sulfonic acids and salts thereof are useful as intermediates for chemical synthesis, and also, in certain cases, may find uses as wetting, detergent or emulsifying agents.

The simplest $\beta$-amino sulfonic acid is known as taurine, which has been obtained by hydrolysis of taurocholic acid, and which has been found useful in the preparation of wetting, detergent and emulsifying agents. However, the major deterrent to its wider use has been its relatively high price.

The reduction of the new nitro sulfonic acids and salts thereof to the corresponding $\beta$-amino sulfonic acids provides a new procedure for the production of taurine and taurine-homologues by a relatively simple and cheap procedure.

Since it is obvious that various changes and modifications may be made in the above description without departing from the nature or spirit thereof, this invention is not restricted thereto except as set forth in the appended claims.

I claim:

1. A process for the preparation of aliphatic $\beta$-amino sulfonic acids, which comprises reacting salts of aliphatic $\beta$-nitro sulfonic acids with hydrogen.

2. A process for the preparation of aliphatic $\beta$-amino sulfonic acids, which comprises reacting the ammonium salt of an aliphatic $\beta$-nitro sulfonic acid with hydrogen.

3. A process for the preparation of an aliphatic $\beta$-amino sulfonic acid, which comprises reducing the ammonium salt of an aliphatic $\beta$-nitro sulfonic acid by iron reduction, removing the liberated ammonia from the reaction mixture, filtering the reaction mixture, converting the ferrous ions produced in the reaction to ferric ions, removing said ferric ions from the solution, and thereafter separating the aliphatic $\beta$-amino sulfonic acid from said solution.

4. A process for the preparation of an aliphatic $\beta$-amino sulfonic acid, which comprises treating an aqueous solution of an ammonium salt of an aliphatic $\beta$-nitro sulfonic acid with hydrogen in the presence of a nickel catalyst, and separating the aliphatic $\beta$-amino sulfonic acid from the reaction mixture.

5. A process for the preparation of 2-amino-butane-1-sulfonic acid, which comprises reducing ammonium-2-nitro-butane-1-sulfonate by iron reduction, removing the liberated ammonia from the reaction mixture, filtering the reaction mixture, converting the ferrous ions produced in the reaction to ferric ions, removing said ferric ions from the solution, and thereafter separating the 2-amino-butane-1-sulfonic acid from said solution.

6. A process for the preparation of 2-amino-ethane sulfonic acid which comprises reducing ammonium-2-nitroethane-1-sulfonate with hydrogen.

7. A process for the preparation of 2-amino-propane-1-sulfonic acid which comprises reducing ammonium-2-nitropropane-1-sulfonate with hydrogen.

8. A process for the preparation of 2-amino-butane-1-sulfonic acid which comprises reducing ammonium-2-nitrobutane-1-sulfonate with hydrogen.

9. A process for the preparation of aliphatic $\beta$-amino sulfonic acids which comprises reducing a salt of a $\beta$-nitro aliphatic sulfonic acid by iron reduction, converting the ferrous ions to ferric ions, removing said ferric ions from the solution and thereafter separating the aliphatic $\beta$-amino sulfonic acid from said solution.

10. A process as set forth in claim 9 wherein the cation of the salt of the $\beta$-nitro aliphatic sulfonic acid is a metal and an acid is added as the reaction proceeds to neutralize the hydroxide of said metal produced.

MARVIN H. GOLD.

(References on following page)

REFERENCES CITED

The following references are of record in the file of this patent:

UNITED STATES PATENTS

| Number | Name | Date |
|---|---|---|
| 405,935 | Andresen | June 25, 1899 |
| 691,132 | Gerresheim | Jan. 14, 1902 |
| 1,999,432 | Ulrich | Apr. 30, 1935 |
| 2,103,879 | Ufer | Dec. 28, 1938 |
| 2,170,380 | Holsten | Aug. 22, 1939 |
| 2,181,890 | Harris | Dec. 5, 1939 |
| 2,363,819 | Von Glan | Nov. 28, 1944 |
| 2,465,803 | Heath et al. | Mar. 29, 1949 |

FOREIGN PATENTS

| Number | Country | Date |
|---|---|---|
| 805,092 | France | Nov. 10, 1936 |
| 571,157 | Great Britain | 1945 |

OTHER REFERENCES

Mayo, "Chemical Reviews," vol. 27, pp. 394 to 399 (1940).